United States Patent [19]

White et al.

[11] 4,119,535

[45] Oct. 10, 1978

[54] METHOD OF SANITIZING A VOLUME OF WATER IN CONJUNCTION WITH CHLORINE

[76] Inventors: Eugene B. White, 126 S. East Ave., Oak Park, Ill. 60302; Mahindar N. Sharma, 245 W. Main St., Lake Zurich, Ill. 60047

[21] Appl. No.: 613,517

[22] Filed: Sep. 15, 1975

Related U.S. Application Data

[62] Division of Ser. No. 351,595, Apr. 16, 1973, abandoned.

[51] Int. Cl.$^2$ ................................................ C02B 3/06
[52] U.S. Cl. ........................................ 210/62; 210/64
[58] Field of Search ................. 210/62, 64; 260/309.5; 21/58

[56] References Cited

U.S. PATENT DOCUMENTS

| | | | |
|---|---|---|---|
| 2,130,805 | 9/1938 | Levine | 210/62 |
| 3,136,716 | 6/1964 | Kitter | 210/64 |
| 3,147,219 | 1/1964 | Peterson | 210/62 |
| 3,346,446 | 10/1967 | Zsoldos | 210/62 |

*Primary Examiner*—Thomas G. Wyse
*Attorney, Agent, or Firm*—Hill, Gross, Simpson, Van Santen, Steadman, Chiara & Simpson

[57] ABSTRACT

A method of sanitizing a volume of water, such as a swimming pool, in conjunction with chlorine, and a bromine-containing material which in the presence of water is adapted to release the bromine, as available bromine, the quantities of the added material being determined relative to the pH of the water prior to such addition, two materials being provided, one being used when the pH of the water is below a predetermined figure and the other being employed when the pH is above a predetermined figure, the respective materials being adapted to bring the pH of the water to a predetermined value and at the same time provide available bromine, the materials involved employing a bromo-organic compound and either an alkaline or acidic reactive material, the latter being present in excess to that required to effect the desired conversion of the bromine, with the respective materials being present in relative quantities adapted to effect the desired control of the pH and simultaneously provide a predetermined halogen content which may be utilized in conjunction with the addition of available chlorine into the water to bring the total halogen content to a desired level.

4 Claims, No Drawings

METHOD OF SANITIZING A VOLUME OF WATER IN CONJUNCTION WITH CHLORINE

This is a division, of application Ser. No. 351,595, filed Apr. 16, 1973 abandoned.

BACKGROUND OF THE INVENTION

The present invention is directed to a method, and material for use therewith, in the sanitizing of water, particularly for utilization in swimming pool sanitation, and the invention therefore will be described in connection therewith.

The popularity of swimming and swimming pools has been constantly increasing from year to year and is recognized as one of the best forms of exercise and recreation. However, swimming, more than any other recreational activity exposes the participants to unhealthy conditions, primarily because of the use of the same water by relatively large numbers of people. It will be appreciated that even a clean looking pool, filled with clear water, may be unsafe because of invisible infectious bacterial or other germs in the water.

Contaminants normally are constantly introduced into pool water from various sources, the air, rain, and the bathers. Probably the greatest quantity of harmful contaminants are introduced by the swimmers, which contaminants must be rapidly destroyed or removed from the pool. Those such as bacteria, viruses and algae, are destroyed by disinfectants and algaecides. Others, such as suspended matter, are removed from the pool water by passage of the water through a suitable filter. With the constantly increasing numbers of swimmers using common pool water, scientific water treatment and control is an absolute necessity for the protection of the participants. The term "pool water control" is a term applied to the treatment of pool water with chemicals to keep it sanitized, comfortable, healthful and visibly appealing.

An ideal disinfectant for such purposes would be one having a highly germicidal action, readily soluble in water, stable, non-toxic, non-corrosive to metals and non-irritating to the skin. Likewise, it should be capable of penetrating without being inactivated by organic materials, and must be of low cost.

All of the halogens are bactericidal and virucidal with fluorine possessing the greatest germicidal activity, followed by iodine, bromine and chlorine. However, because of its availability and economy, chlorine is used extensively for the large scale disinfection of water, swimming pools and food processing plants. Due to the constant contamination, sanitizing chemicals must be added regularly to swimming pool water to kill bacteria and control algae. Bacteria enter the pool through dust, rain and the human body, with the latter being the most significant source. These organisms may survive for weeks at temperatures near 70° F. or for months at lower temperatures. The chlorine is added to the pool water, first to kill bacteria and algae, and secondly to oxidize undesirable organic matter, and in general a properly maintained chlorine residual in the pool water will generally accomplish the desired purposes.

The effectiveness of the sanitizing operation is also dependent upon the condition of the water as to its acidity or alkalinity, i.e. the pH, of the water, and proper balance thereof is important with respect to its effects on coagulation-filtration treatments, disinfecting effect of the chlorine, and physical effects on the swimmers, as for example, with respect to the eyes and skin.

As a result of studies, the recommended pH for pool water is from 7.2 to 7.6 and thus slightly on the alkaline side, preferably about 7.2, 7.0 being neutral, below 7.0 acidic, and above 7.0 alkaline. Generally, a pH below 7.0, or a very high pH, may result in skin or eye irritations while efficiency will be reduced below or above the optimum figures referred to, with maximum bactericidal efficiency of the chlorine residual being at a maximum between 7.2 and 7.6 which also is a non-irritating range.

As chlorine in water is a very active chemical agent, if a small amount is added thereto, it will react with the many substances dissolved or suspended in the water and will then be destroyed as a disinfecting agent. Chlorine readily reacts with reducing compounds such as hydrogen sulfide, manganese, iron and nitrites, and results in a loss disinfection. If enough chlorine is added to complete the reaction with the reducing compounds, then a little additional chlorine will react with any organic matter to form chlororganic compounds, which likewise have little or no disinfecting action, and may produce undesirable taste and odors. If enough chlorine is added to react with all the reducing compounds and the organic matter, a little additional chlorine will react with any ammonia which may be present to produce chloramines, which are weak disinfectants and which would require high concentrations and long contact times if effective destruction of bacteria were to be accomplished. When all the above reactions have been completed any additional chlorine added will be present as free, available chlorine residual, a very active disinfecting agent. The resulting graphic curve of these reactions of chlorine and water is termed the "chlorine demand curve".

To facilitate an understanding of the present invention it is believed that a brief review of the disinfecting action of chlorine likewise is desirable.

When chlorine, $Cl_2$, dissolves in water, it immediately hydrolyzes according to the reaction:

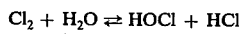

$$Cl_2 + H_2O \rightleftharpoons HOCl + HCl$$

The chlorine of the hydrochloric acid does not contribute to the purification reaction. It is the hypochlorous acid, HOCl which actually kills the microbial bodies. The bactericidal power of hypochlorous acid is attributed to its ability to defuse through cell walls and reach the vital parts of the bacteria cells. Consequently, whether chlorine is added to water by chlorination or hypochlorination, the chemical action for sanitation and purification is the same, i.e. hypochlorous acid, HOCl.

Hypochlorous acid, being a weak acid, ionizes in water according to the equation:

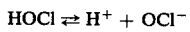

$$HOCl \rightleftharpoons H^+ + OCl^-$$

This equilibrium is instantaneous and reversible. However, when the pH is lowered, i.e. more acid or H+ ion is added to the system, the equilibrium is forced to the left and more hypochlorous acid is present. Conversely, when the pH is raised, the acid concentration, H+ ion is lowered and more of the hypochlorous acid is forced over toward the hypochlorite OCl−. Consequently, any free chlorine or hypochlorite added to water will immediately distribute itself into HOCl and OCl−, with the ratio for the two being controlled entirely by the pH value of the water. Obviously, in view of the great difference in killing power between the two, the pH value becomes of the greatest importance with respect to disinfection. At the recommended pH of 7.2 to 7.4, the HOCl, H$^+$ and OCl$^-$ are in a suitable balance. In this connection, it should be noted that the pH value involved is that reached after the addition of the chlorine compounds, not the original pH value of the water.

Ideal swimming pool conditions will exist only if the right amounts of chemicals are added in balance, too little chlorine permitting live bacteria, and too much causing irritation to the eyes and mucous membranes.

BRIEF SUMMARY OF THE INVENTION

The present invention is directed to a method of water treatment, particularly swimming pool sanitation, that in a very simple manner, not only provides effective bactericidal action but also stabilizes and conditions the water, effectively controlling the acidity-alkalinity pH balance in the water, as well as conditioning the same to prevent the rapid loss of chlorine due to summer sun, and heat by simultaneously providing free bromine.

The present invention thus simultaneously and successfully solves six major swimming pool water problems that thus far have been incapable of solution by any other single chemical compound, as follows:

1. Maintains an active sanitizer reserve.
2. Eliminates stabilizer problems.
3. Provides effective pH control.
4. Keeps filters open.
5. Banishes chlorine odor.

The present invention involves the novel treatment of the water in dependence upon the pH value of the water, adding the materials utilized in the method in ratios which will provide pH balance, as well as providing an additional available bromine content to provide efficient sanitizing along with pH control and stabilization of the halogen content.

The invention is based upon the well known chemical reaction in which the lower molecular weight chlorine will replace the higher molecular weight bromine when the two are present in a common solution. When added to pool water, the material is converted to germicidal hypobromous acid which reacts with impurities to form soluble residual, bromine salts. Upon the addition of the chlorine sanitizer to the water, the free available chlorine will displace the bromine from such salts, so that it is again available to perform the desired germicidal action, i.e. regenerate the bromine to available bromine.

As a result, the pool will be functioning with two halogenic materials, both proven germicidal, with a continuing regeneration of bromine so that there will constantly be a bromine residual available to assist the chlorine. Residual halogen tests, e.g. orthotolidine, of the water will read the same for chlorine, bromine and mixtures thereof, and the reserve amount thus may be a combination of both halogens.

The importance of the bromine reserve is that such halogen is immediately and actively available for sanitation and oxidation. Likewise the combination of chlorine and bromine in the reaction makes the resultant sanitizer less likely to disappear from the pool by action of sunlight, pool bather load, dust, and the like, the bromine, being a heavier atom (79.916) than chlorine (35.457), being more stable in water and thus remains.

A further advantage of the combination is the fact that chlorine and bromine are miscible and offset certain physical properties of each other, this being particularly true with respect to taste and odors, whereby such objectionable characteristics of the basic chemicals are eliminated.

As mentioned, the present method involves the use of two corresponding materials, one adapted for use where the initial pH is above the desired value, and the other where the initial pH is below the desired value.

In practicing the method, the operator merely obtains a pH reading of the water and then in dependence upon the reading, and in particular whether the same is above or below the desired optimum, broadcasts or otherwise supplies the appropriate material, in quantities and in accordance with the teachings of the invention, into the pool of water, then determines the halogen residual content then present in the water, and, if necessary, supplies additional chlorine to bring the residual content to the number of parts per million desired.

The materials involved broadly comprise a bromine-containing organic compound having the characteristics of stability in solid state (dry granules) under normal temperatures to which it would be subjected, which contains a relatively high percentage of available bromine, and will readily react with a reactive agent in the presence of water to give up such bromine content. Further, the material should be such that the remaining compound, after release of the bromine, is water-soluble and non-toxic in concentrations in which it would normally represent in such water to be sanitized. Such material is present in a mixture with a reactive agent which likewise is stable in a solid state (dry granules) under normal temperatures to which it would be subjected, is readily soluble in water, and will in the presence of water readily combine with such bromine-containing compound to release the bromine therefrom, with any other compounds thereof remaining from such reaction being water-soluble and non-toxic in concentrations in which it would normally be present in such water to be sanitized. The two materials may be supplied as a dry mixture, with the reactive compound being present in an amount in excess of that required to release all of the bromine content of said bromine-containing material. The proportions of the materials are such that such excess is present in an amount operable to provide a predetermined change in the pH of the water treated therewith, i.e., to bring the pH of the water into the desired range. Likewise the amount of bromine-containing material is such that the halogen content in such water will not be greater than a predetermined value suitable for sanitizing purposes in accordance with established sanitizing techniques.

As previously mentioned, one of the two materials to be added to the water is selected on the basis of the direction in which the pH is to be altered, and normally the same bromine-containing material will be suitable for both materials, with the difference therebetween thus residing in the selection of the reactive agent, i.e. an acidic reactive agent being employed where the pH is to be reduced, and an alkaline reactive agent being employed where the pH is to be raised.

While other materials may at least theoretically be employed, as hereinafter discussed in detail, we have found that very effective results can be obtained utilizing for the bromine-containing compound a 1,3-dibromo-5,5-dimethyl hydantoin with the reactive agent comprising either sodium bisulfate or sodium carbonate. While theoretically it might be deemed possible to employ an inorganic bromo-compound, the organic compounds are deemed preferable as the displacement of bromine therefrom may be efficiently accomplished at higher pH values than would otherwise be required for a comparable displacement from an inorganic material. Likewise, other reactive agents, meeting the specified requirements may be employed.

DETAILED DESCRIPTION OF THE INVENTION

The invention will be described in detail, first in connection with the materials involved and second, the method of employing such materials.

in accordance with the present method will provide proper correction of the pH value and simultaneously provide the desired concentrations of available bromine. In considering the amounts to be added to the water to achieve the desired results, for the purposes of explanation, the amounts will be calculated on the basis of 10,000 gallon units, i.e. the amount of material to be added to 10,000 gallons of water to correct the pH value from an initial value to the desired range.

Considering first the reactions involved in connection with the use of the 1,3-dibromo-5,5-dimethylhydantoin and the acidic reaction agent when the two are dissolved in water, the following reactions will take place:

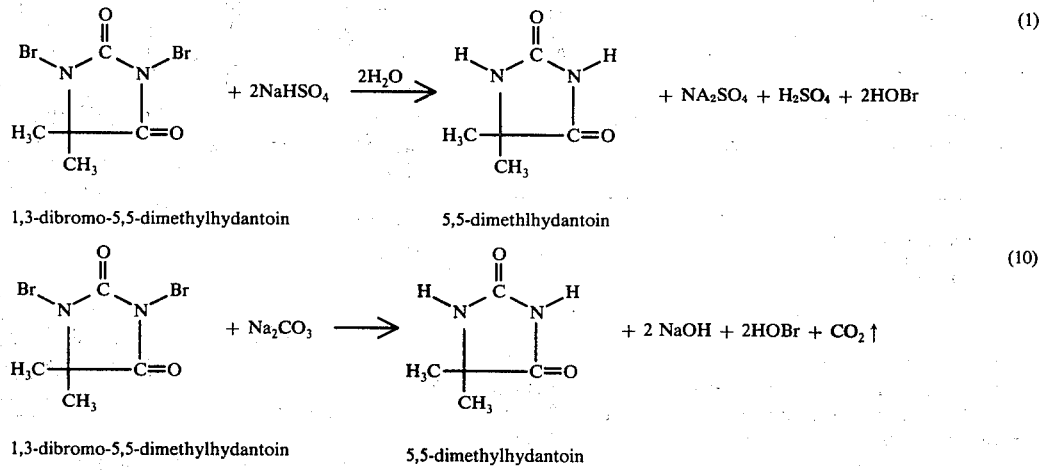

MATERIALS

Of possible materials to be employed in connection with the practice of the invention, 1,3-dibromo-5,5-dimethylhydantoin is believed to possess the greatest number of advantages and the invention will, therefore, be primarily described with respect to its use. Such advantages include a high percentage of available bromine, stability both alone and when employed in mixtures according to the invention, the relative ease with which the bromine may be liberated, and in particular the ability to readily release the bromine at the pH values involved. An organic bromine-containing material is employed over an inorganic material in view of the fact that the organic material does not require as low a pH of the solution involved to achieve the desired release of bromine.

As previously mentioned, two forms of the material according to the invention are provided, in one of which an alkaline reactive agent is employed, and in the other of which an acidic reactive agent is employed. Preferably, sodium bisulfate is employed as the acidic agent and sodium carbonate as the alkaline agent. Both of these reactive agents are, for the purposes of the invention, stable at temperatures to which the material may be normally subjected and all three of the materials involved may be readily obtained in powdered form, capable of being intimately mixed, whereby the final product may be termed "completely homogenized". Naturally the presence of moisture is to be avoided.

Both of the reactive agents are present, in their respective mixtures, in amounts in excess of that required to liberate all of the bromine present, with the amounts of such excess being carefully determined to provide the desired results, i.e. that introduction of the material $$H_2SO_4 \rightarrow H^+ + HSO_4^- \qquad (2)$$

$$H^+ + H_2O \rightarrow H_3O^+ \text{ (hydronium ion)} \qquad (3)$$

$$H_2SO_4 + H_2O \rightarrow H_3O^+ + HSO_4^- \qquad (4)$$

$$HSO_4^- + H_2O \rightarrow H_3O^+ + SO_4^{--} \text{ (hydronium ion)} \qquad (5)$$

Likewise:

$$2HOBr \rightarrow 2HBr + O_2 \text{ nascent oxygen} \qquad (6)$$

Further, the oxidizing action of $H_2SO_4$ on HBR takes the following course:

$$H_2SO_4 + 2HBr \rightarrow Br_2 + SO_2 + 2H_2O \qquad (7)$$

$$Br_2 + H_2O \rightarrow HBr + HOBr \qquad (8)$$

$$HOBr \rightarrow HBr + O \text{ nascent oxygen} \qquad (9)$$

Similarly, considering the reactions involved in connection with the use of the 1,3-dibromo-5,5-dimethylhydantoin and alkaline reaction agent when the two are dissolved in water, the following reactions will take place:

See equation (10)

$$Na_2CO_3 \rightarrow 2Na^+ + CO_3^{--} \qquad (11)$$

$$CO_3^{--} + H_2O \rightarrow HCO_3^- + OH^- \qquad (12)$$

$$HCO_3^- + H_2O \rightarrow H_2CO_3 + OH^- \qquad (13)$$

$$Na_2CO_3 + 2H_2O \rightarrow 2Na^+ + H_2CO_3 + 2OH^- \text{ (hydroxide ions)} \qquad (14)$$

Likewise:

$$2HOBr \rightarrow 2HBr + O_2 \text{ nascent oxygen} \quad (15)$$

Further, the NaOH ionizes as follows:

$$NaOH \rightarrow Na^+ + OH^- \text{ (hydroxide ion)} \quad (16)$$

Considered stoichiometrically, the relative proportions of the respective materials, to effect full release of the available bromine would be as follows:

| | Ratio by wt. | % by wt. |
|---|---|---|
| Dibromodimethylhydantoin | 1.00 | 54.4 |
| NaHSO$_4$ | 0.84 | 45.6 |
| | 1.84 | 100.0 |

Likewise, where sodium bicarbonate is employed the amounts would be as follows:

| | Ratio by wt. | % by wt. |
|---|---|---|
| Dibromodimethylhydantoin | 1.00 | 73.00 |
| Na$_2$CO$_3$ | 0.37 | 27.00 |
| | 1.37 | 100.00 |

In preparing the mixtures according to the invention, both the alkaline and acidic mixtures in the examples described have a ratio of one part by weight of organic material to 29 parts of reaction agent. The figures in such case then are:

| | Ratio by wt. | % by wt. |
|---|---|---|
| Dibromodimethylhydantoin | 1.00 | 3.33 |
| Na$_2$CO$_3$ | 29.00 | 96.67 |
| | 30.00 | 100.00 |

| | Ratio by wt. | % by wt. |
|---|---|---|
| Dibromodimethylhydantoin | 1.00 | 3.33 |
| NaHSO$_4$ | 29.00 | 96.67 |
| | 30.00 | 100.00 |

The excess of 28.63 parts, i.e. (29.0–0.37) of Na$_2$CO$_3$ is utilized for increasing the pH of the pool water.

The excess of 28.16 parts, i.e. (29.0–0.84) of NaHSO$_4$ is utilized for reducing the pH of the pool water.

While the invention has been illustrated in connection with 1,3-dibromo-5,5-dimethylhydantoin, it may, in specific applications, be possible or desirable to employ another material or materials in lieu thereof, although from the standpoint of percentage of available bromine, overall characteristics for the intended purposes, commercial availability and cost, it is believed that the dibromodimethylhydantoin is currently preferable over other presently available materials.

However, the following bromine-containing materials may be employed in the practice of the invention, assuming that the lower efficiency, lesser stability and increased cost may be tolerated or otherwise rendered acceptable: dibromomethylhydantoin, dibromoethylmethylhydantoin, monobromoethylmethylhydantoin, dibromomethylisopropyl, monobromomethylisopropyl, dibromomethylisobutylhydantoin, dibromomethylisobutylhydantoin, monobromomethylisobutylhydantoin, N-bromoacetamide (NBA) and N-bromosuccinimide (NBS).

THE METHOD

In practicing the method of the invention, no extensive test equipment or materials, or complex steps are involved, in view of which the pool operator or the like can readily and easily maintain desired conditions in the pool, utilizing his present equipment and present mode of sanitizing with chlorine.

The first step is to determine the pH of the pool water, utilizing therefor, for example, a standard test kit. The operator then utilizes such reading in the determination of the specific type of material to be employed, utilizing that containing the acid reactive agent if the pH reads above 7.4 or that containing the alkaline reactive agent if the pH reading is below 7.2. The material so selected is then suitably introduced into the pool water in specified quantities, for example, added to the skimmer or broadcast on the pool water.

Assuming the pH is above 7.4, the selected material would be introduced in accordance with the following table:

| pH reading | Acidic Material per 10,000 Gallons |
|---|---|
| up to 7.6 | 4 oz. (½ cup) |
| up to 7.8 | 8 oz. (1 cup) |
| up to 8.0 | 1 lb. (2 cups) |

If, on the other hand, the pH reads below 7.2, the material employing the alkaline reactive agent is employed in accordance with the following table:

| pH reading | Alkaline Material per 10,000 Gallons |
|---|---|
| up from 6.8 | 2 lbs. (4 cups) |
| up from 7.0 | 1 lb. (2 cups) |
| up from 7.1–7.2 | 8 oz. (1 cup) |

With the pool water adjusted to a pH range of 7.2 – 7.4, the amount of chlorine sanitizer is then added to the pool water necessary to bring the chlorine to a level in accordance with recommended sanitizing procedures.

Upon the addition of the chlorine or chlorine compound to water, which has been adjusted to the desired pH range by means of the present invention, the following reactions take place:

| Cl$_2$ + H$_2$O | HCl + HOCl | (17) |
|---|---|---|
| HOCl | HCl + O nascent oxygen | (18) |
| HOBr + HCl | HOCl + HBr | (19) |
| HBr from equation (6) (8) (9) (15): | | |
| HBr + HOCl | HCl + HOBr | (20) |
| and | | |
| HOBr | HBr + O nascent oxygen | (21) |

The advantages of the use of the two halogenic materials has been previously discussed, as well as the advantages of stabilizing the halogen content, rendering the sanitizer less subject to disappearance from the pool water by external condition, etc. its efficiency when employed with liquid or dry chlorine products, for example, sodium hypochlorite, calcium hypochlorite, lithium hypochlorite, etc., and at the same time the minimizing of the pH control.

Likewise, other reactive agents meeting the specified requirements may be employed; for example, sulfamic acid and potassium carbonate.

The method and materials of the present invention also work effectively with chlorinated isocyanurate products currently on the market such as sodium dichloroisocyanurate (NaDCC), and trichloroisocyanurate (TCC). As previously discussed with respect to the efficiency of chlorine and the advantages of the present invention when used therewith, the present invention will likewise reduce the NaDCC dosage required by increasing the efficiency of NaDCC solution and will provide bromine as an active sanitizing agent with chlorine for more effective disinfection. As the NaDCC involves cyanurate acid, its introduction into the pool water will tend to reduce the pH and the alkaline material of the present invention along with additional soda ash, if necessary, would therefore be used therewith.

In the case of TCC, the pH value of a 1% solution thereof is 3.0, consequently greater amounts of soda ash would be required therewith than with the NaDCC, and in this case the alkaline material will likewise be employed therewith.

Although various minor modifications might be suggested by those versed in the art, it should be understood that we wish to embody within the scope of the patent warranted hereon all such modifications as reasonably and properly come within the scope of our contribution to the art.

We claim as our invention:

1. A supplemental treatment for swimming pool water and the like, which is primarily sanitized by maintenance of an available chlorine content in such water, introduced therein from known chlorine-containing materials by means of known procedures, comprising, following a previous chlorination of such water, the steps of ascertaining by test, the pH of such water, adding to such water an amount, per unit volume of water, of a supplemental material sufficient to bring the pH of the water from the test value to between approximately 7.2 and 7.4, which supplemental material comprises a mixture of 1,3-dibromo-5,5-dimethylhydantoin and an inorganic reactive compound therefor which, in the presence of water, will readily combine with said hydantoin to release bromine therefrom, with such inorganic compound being present in excess of that required to release all of the bromine content of said hydantoin, utilizing $NaCO_3$ as said reactive compound, if said test discloses the pH of the water to be treated to below 7.2, the proportions of the materials, by weight, being as follows:

| Dibromodimethylhydantoin | 1.00 |
| NaCO$_3$ | 29.00 | introducing said supplemental material into the water to be treated in approximately the following amounts:

| pH Reading | Supplemental Material per 10,000 Gallons |
| --- | --- |
| up from 6.8 | 2 lbs. (4 cups) |
| up from 7.0 | 1 lb. (2 cups) |
| up from 7.1–7.2 | 8 oz. (1 cup) | whereby the excess therein of said reactive compound will bring the pH of the water treated therewith up to approximate 7.2–7.4, said amounts of hydantoin and reactive compound being so proportioned with respect to the amount of excess reactive compound that upon said addition of such material to the water to be treated, to effect the specified pH change, the amount of hydantoin will be sufficient to provide a desired amount of available bromine per unit volume of water, not greater than a predetermined maximum value suitable for sanitizing purposes in accordance with established sanitizing techniques, and thereafter, if necessary, adding available chlorine to such water in quantities sufficient to provide a predetermined residual amount of available halogen in such water.

2. A supplemental treatment for swimming pool water and the like, which is primarily sanitized by maintenance of an available chlorine content in such water, introduced therein from known chlorine-containing materials by means of known procedures, comprising, following a previous chlorination of such water, the steps of ascertaining by test, the pH of such water, adding to such water an amount per unit volume of water, of a supplemental material sufficient to bring the pH of the water from the test value to between approximately 7.2 and 7.4, which supplemental material comprises a mixture of 1,3-dibromo-5,5-dimethylhydantoin and an inorganic reactive compound therefor which, in the presence of water, will readily combine with said hydantoin to release bromine therefrom, with such inorganic compound being present in excess of that required to release all of the bromine content of said hydantoin, utilizing $NaHSO_4$ as said reactive compound, if said test discloses the pH of the water to be treated to be above 7.4, the proportions of the materials, by weight, being as follows:

| Dibromodimethylhydantoin | 1.00 |
| NaHSO$_4$ | 29.00 | introducing said supplemental material into the water to be treated in approximately the following amounts:

| pH Reading | Supplemental Material per 10,000 Gallons |
| --- | --- |
| up to 7.6 | 4 oz. (½ cup) |
| up to 7.8 | 8 oz. (1 cup) |
| up to 8.0 | 1 lb. (2 cups) | whereby the excess therein of said reactive compound will bring the pH of the water treated therewith down to approximately 7.4–7.2, said amounts of hydantoin and reactive compound being so proportioned with respect to the amount of excess reactive compound that upon said addition of such material to the water to be treated, to effect the specified pH change, the amount of hydantoin will be sufficient to provide a desired amount of available bromine per unit volume of water, not greater than a predetermined maximum value suitable for sanitizing purposes in accordance with established sanitizing techniques, and thereafter, if necessary, adding available chlorine to such water in quantities sufficient to provide a predetermined residual amount of available halogen in such water.

3. A supplemental treatment for swimming pool water and the like, which is primarily sanitized by maintenance of an available chlorine content in such water, introduced therein from known chlorine-containing materials by means of known procedures, comprising, following a previous chlorination of such water, the steps of ascertaining by test, the pH of such water, adding to such water an amount, per unit volume of water, of a supplemental material sufficient to bring the pH of the water from the test value to between approximately 7.2 and 7.4, which supplemental material comprises a mixture of 1,3-dibromo-5,5-dimethylhydantoin and an inorganic reactive compound therefor which, in the presence of water, will readily combine with said hydantoin to release bromine therefrom, with such inorganic compound being present in excess of that required to release all of the bromine content of said hydantoin, utilizing $NaCO_3$ as said reactive compound, if said test discloses the pH of the water to be treated to be below 7.2, the proportions of the materials, by weight, being as follows:

| | |
|---|---|
| Dibromodimethylhydantoin | 1.00 |
| $NaCO_3$ | 29.00 | introducing in the water to be treated a sufficient amount of such supplemental material, per unit volume of water, that the excess therein of said reactive compound will bring the pH of the water treated therewith up approximately 7.2 to 7.4, said amounts of hydantoin and reactive compound being so proportioned with respect to the amount of excess reactive compound that upon said addition of such material to the water to be treated, to effect the specified pH change, the amount of hydantoin will be sufficient to provide a desired amount of available bromine per unit volume of water, not greater than a predetermined maximum value suitable for sanitizing purposes in accordance with established sanitizing techniques, and thereafter, if necessary, adding available chlorine to such water in quantities sufficient to provide a predetermined residual amount of available halogen in such water.

4. A supplemental treatment for swimming pool water and the like, which is primarily sanitized by maintenance of an available chlorine content in such water, introduced therein from known chlorine-containing materials by means of known procedures, comprising, following a previous chlorination of such water, the steps of ascertaining by test, the pH of such water, adding to such water an amount, per unit volume of water, of a supplemental material sufficient to bring the pH of the water from the test value to between approximately 7.2 and 7.4, which supplemental material comprises a mixture of 1,3-dibromo-5,5-dimethylhydantoin and an inorganic reactive compound therefor which, in the presence of water, will readily combine with said hydantoin to release bromine therefrom, with such inorganic compound being present in excess of that required to release all of the bromine content of said hydantoin, utilizing $NaHSO_4$ as said reactive compound, if said test discloses the pH of the water of be treated to be above 7.4, the proportions of the materials, by weight, being as follows:

| | |
|---|---|
| Dibromodimethylhydantoin | 1.00 |
| $NaHSO_4$ | 29.00 | introducing in the water to be treated a sufficient amount of such supplemental material, per unit volume of water, that the excess therein of said reactive compound will bring the pH of the water treated therewith down to approximately 7.4 to 7.2, said amounts of hydantoin and reactive compound being so proportioned with espect to the amount of excess reactive compound that upon said addition of such material to the water to be treated, to effect the specified pH change, the amount of hydantoin will be sufficient to provide a desired amount of available bromine per unit volume of water, not greater than a predetermined maximum value suitable for sanitizing purposes in accordance with established sanitizing techniques, and thereafter, if necessary, adding available chlorine to such water in quantities sufficient to provide a predetermined residual amount of available halogen in such water.

* * * * *

UNITED STATES PATENT AND TRADEMARK OFFICE
CERTIFICATE OF CORRECTION

PATENT NO. : 4,119,535
DATED : October 10, 1978
INVENTOR(S) : Eugene B. White et al It is certified that error appears in the above-identified patent and that said Letters Patent are hereby corrected as shown below:

Col 6 (1) "5.5-dimethlhydantoin" should read
-- 5,5-dimethylhydantoin --.

Col 6 (1) +$NA_2SO_4$ should read --+$Na_2SO_4$--;

Col 8, line 29 "(2/3 cup)" should read --(1/2 cup)--;

Col 10, line 44 "(2/3 cup)" should read --(1/2 cup)--;

Col 12, line 29 "espect" should be --respect--

Signed and Sealed this

Twenty-ninth Day of April 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,119,535

DATED : October 10, 1978

INVENTOR(S) : Eugene B. White, et al.

It is certified that error appears in the above-identified patent and that said Letters Patent are hereby corrected as shown below:

Column 6, equation (5), change "$H_3O^+ + SO_4^{--}$ (hydronium ion)" to --$SO_4^{--} + H_3O^+$ (hydronium ion)--; equation (11), change "$CO^{--}$" to --$CO_3^{--}$--; equation (14), "(hydroxide ions)" should be placed to the right of "$2OH^-$".

Column 7, line 20, change "bicarbonate" to --carbonate--.

Column 9, line 48, change "$NaCO_3$" to ---$Na_2CO_3$--; line 54, change "$NaCO_3$" to --$Na_2CO_3$--.

Column 11, line 12, change "$NaCO_3$" to --$Na_2CO_3$--; line 18 change "$NaCO_3$" to --$Na_2CO_3$--.

Signed and Sealed this

Nineteenth Day of August 1980

[SEAL]

Attest:

SIDNEY A. DIAMOND

Attesting Officer

Commissioner of Patents and Trademarks